United States Patent

[11] 3,596,548

[72] Inventors Kazuo Nagai
Chiba;
Masami Fuchigami, Okayama; Isao
Yamato, Okayama, Japan; Manfred Lortz,
Rheydt/Rhineland, Germany
[21] Appl. No. 842,498
[22] Filed July 17, 1969
[45] Patented Aug. 3, 1971
[73] Assignee Maschinenfabrik, Froriep GmbH
Rheydt, Germany
[32] Priority July 19, 1968
[33] Japan
[31] 43/51382

[54] APPARATUS FOR CONTINUOUSLY FORMING
EDGES OF STEEL PLATES INTO BEVELING
3 Claims, 6 Drawing Figs.
[52] U.S. Cl. .................................................. 83/3,
83/256, 83/404, 83/421, 83/461, 83/513, 83/581

[51] Int. Cl. .................................................. B26d 3/02
[50] Field of Search .......................................... 83/3, 404,
419, 421, 461, 513, 517, 581, 256

[56] References Cited
UNITED STATES PATENTS
| | | | |
|---|---|---|---|
| 197,376 | 11/1877 | Jones | 83/404 X |
| 1,790,601 | 1/1931 | Sieffert | 83/404 |
| 1,860,340 | 5/1932 | Biggert, Jr. | 83/421 |
| 1,888,436 | 11/1932 | Richards | 83/404 X |
| 1,986,769 | 1/1935 | Farley et al. | 83/404 X |

Primary Examiner—Frank T. Yost
Attorney—Holman, Glascock, Downing & Seebold

ABSTRACT: Steel plate edge beveling apparatus having a pair of elongate beveling tables with associated beveling tools and conveyor means between the tables for moving plates longitudinally of the tables and laterally between the tables.

APPARATUS FOR CONTINUOUSLY FORMING EDGES OF STEEL PLATES INTO BEVELING

This invention relates to apparatus for continuously beveling the edges of steel plates and more particularly to apparatus suitable for use with plates having different widths.

The invention will be described with reference to the accompanying drawings in which:

FIG. 4 is an enlarged sectional view taken on line V–V in FIG. 3; and

The beveling of steel plate for welding is formed by gas cutting or machine cutting the plate, and is more rapidly and efficiently performed by machine cutting than by the gas cutting method. In addition, the machine cutting method can cut the edge of the steel plate to exact dimensions, which is important for subsequent welding. Further, there is the advantage that beveling to a curvilinear shape in section (so called U-shaped beveling) can be performed by the machine cutting method.

Figure 1:
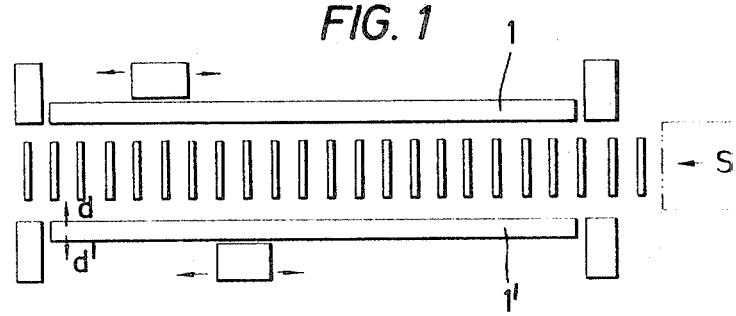
FIG. 1 is a schematical plan view of a conventional apparatus for continuously beveling the edges of steel plates.

Generally, in the machine cutting method the steel plate is conveyed by a roller conveyor and clamped on a table. Then the edge of the steel plate is cut with the cutting tool provided on a carriage which moves along the side of the table. Usually the beveling is carried out on both sides of the steel plate. Therefore, in order to increase the efficiency of working, it is necessary to provide two sets of the table and carriage arrangements. However, when a plurality of steel plates having various widths are to be continuously cut, tables 1 and 1' (see FIG. 1) are provided on opposite sides of the steel plate passage S, one table 1 being fixed and the other table 1' being movable in the direction of arrows d and d'. Generally such an installation is large in size and it is difficult to increase its efficiency because the table must be accurately positioned for obtaining a desired beveling.

The present invention provides apparatus for beveling the edges of steel plates comprising a pair of elongate substantially parallel plate support tables, a beveling tool carriage movable longitudinally along each table, first conveyor means between the tables for conveying plates longitudinally of the tables, second conveyor means movable vertically and positioned between the tables for moving plates laterally between the tables and stop means between the tables for laterally aligning plates with respect to the tool carriages.

Thus in accordance with this invention, there are fixedly provided two tables spaced at a distance in which two of the widest steel plates may be arranged in two rows. Between the tables, two sets of the roller conveyors are arranged in two rows. A plurality of transverse conveyors such as chain conveyors or belt conveyors are provided at a suitable distance between the rollers and adapted to move vertically between the rollers. In one row of the transverse conveyors, a stop member for laterally aligning the steel plate at the edge to be cut thereof is provided, and further the stop member is constructed to move in the transverse direction.

Figure 2:
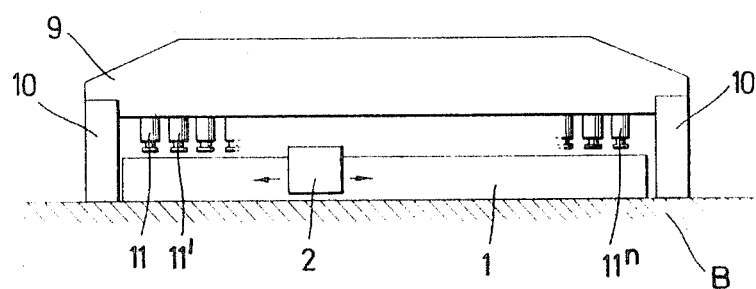
FIGS. 2 and 3 are diagrammatical illustrations of one form of apparatus according to the invention for continuously beveling the edges of steel plate, FIG. 2 being a side elevation and FIG. 3 being a plan view thereof.
Figure 3:
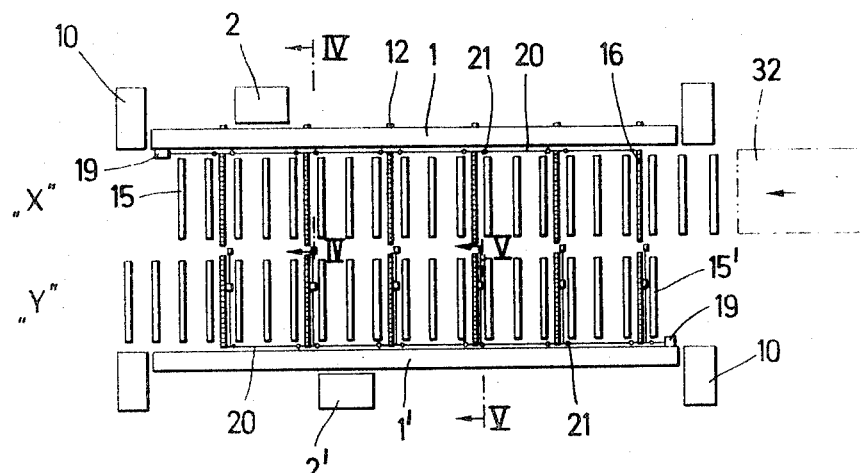
Figure 4:
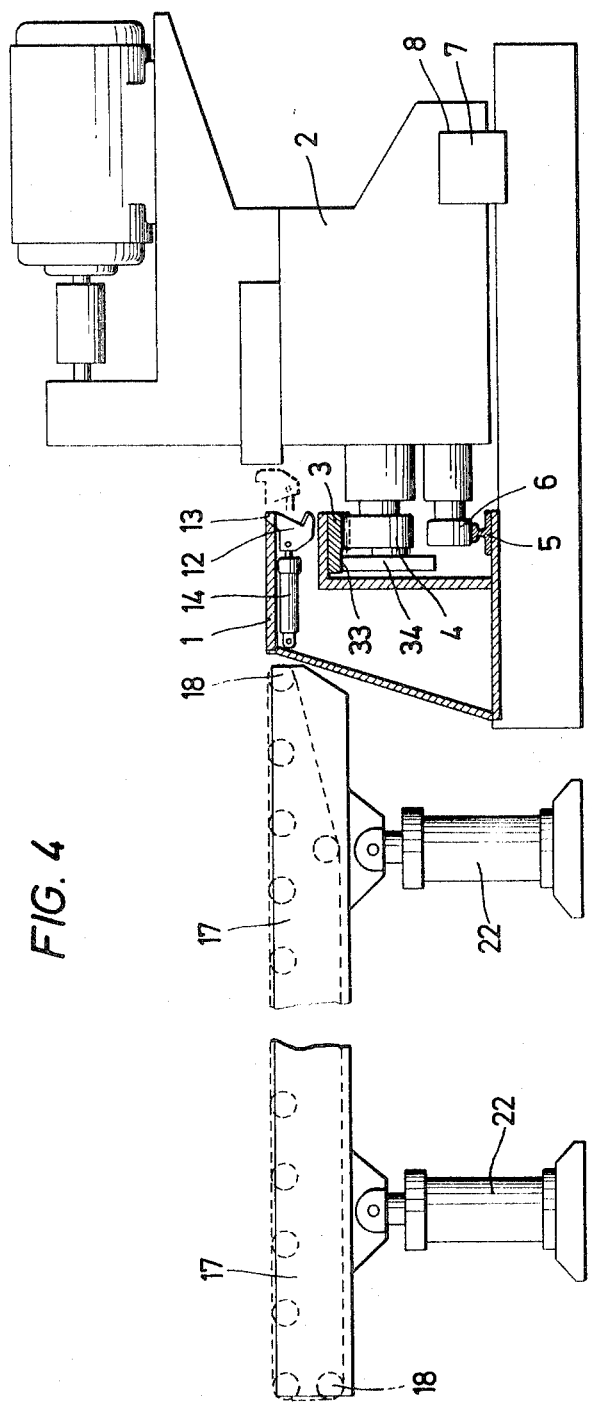
FIG. 4 is a sectional view taken on line IV–IV in FIG. 3.
Figure 5:
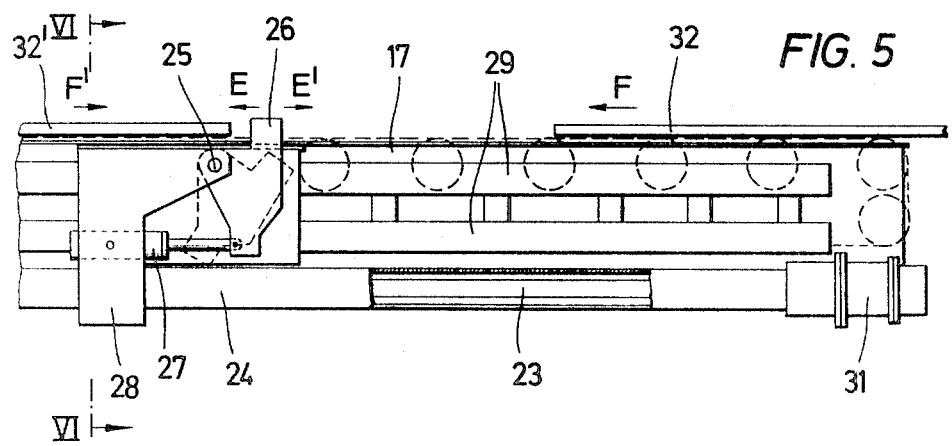
Figure 6:
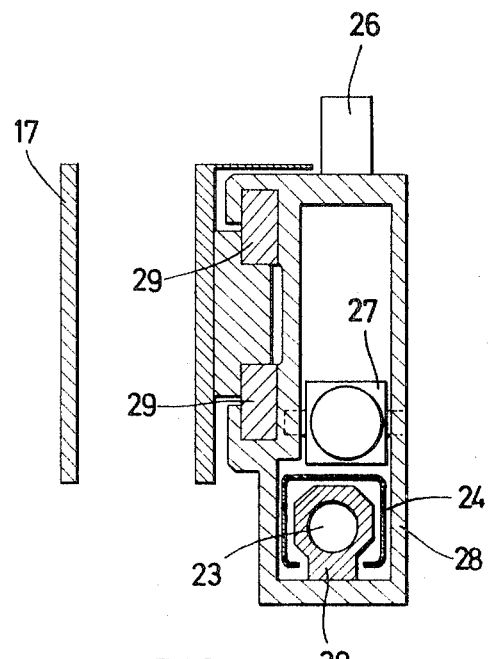
FIG. 6 is a sectional view taken on line VI–VI in FIG. 5.

Referring now to the drawings, FIG. 2 to FIG. 6, there is disclosed, by way of example, an apparatus of this invention. Numerals 1 and 1' are tables parallelly disposed on the base B. Carriages 2 and 2' having cutting tools are provided at the cutting side of each table as shown in FIG. 4. More particularly a pinion 4 provided in the carriage and driven by an electric motor engages with a rack 3 secured to the table 1. The carriage 2 is supported by a rail 5 through a roller 6 and by a rail 7 on which a recess 8 of the carriage is slidably engaged. Upward movement of the carriage is restricted by the engagement of a roller 34 with a rail 33. In FIG. 2, numeral 9 is a beam supported by columns 10 and longitudinally arranged over the table 1. Under the beam 9, a plurality of hydraulic piston and cylinder arrangements 11–11n are provided. At the outside of the table 1, a plurality of stop members 12 are pivoted by pins 13 and adapted to be operated by hydraulic piston and cylinder arrangements 14 provided beneath the table 1.

Between the tables 1 and 1', X- and Y-line roller conveyors 15 and 15' are provided, and chain conveyors (or belt conveyors) 16 are provided at a suitable distance between the chain conveyors. Referring to FIG. 4, the chain (or belt) conveyors 16 are guided by a plurality of chain wheels 18 provided on frames 17 which are supported by hydraulic piston and cylinder arrangements 22. Each conveyor is driven by a driving device 19 through a shaft 20 and a coupling 21. Along the frame 17 of the Y-line chain conveyor 16, guides 29 and a protective pipe 24 having an opening which extends over the underside thereof and contains a screw shaft 23 are provided. On the guides 29 is slidably supported a frame 28 which has a stop member 26 pivoted by a pin 25 and a hydraulic piston and cylinder arrangement 27 connected to the stop member 26. A block 30 secured to the lower portion of the frame 28 is extended into the protective pipe 24 through the opening thereof and fitted upon the screw shaft 23 by the internal screw thread. Thus, rotation of the screw shaft 23 by the driving device 31 causes the frame 28 to slide along the guide 29 to move the stop member 26 in the direction shown by arrows E and E'.

In operation, referring to FIG. 3, a steel plate 32 is fed into the apparatus by the X-line roller conveyor 15. During this operation, the chain conveyor 16 is lowered by operation of the hydraulic piston and cylinder arrangements 22 so as not to obstruct the moving of the steel plate 32. After feeding of the steel plate, the stop member 13 is projected by the hydraulic piston and cylinder arrangement 14 from the solid line position to the dotted line position shown in FIG. 4, and the frame 17 is lifted by the hydraulic piston and cylinder arrangement 22 so that the steel plate may be supported by the chain conveyor 16. In such a condition, the chain conveyor 16 is driven by the driving device 19 to move the steel plate 32 toward the table 1, and when the leading edge of the steel plate 32 contacts to the stopping member 13, the moving of the steel plate is stopped. The steel plate 32 is then pressed downwardly by the hydraulic piston and cylinder arrangements 11 to be fixed on the table 1. Thereafter, the carriage 2 is moved along the table 1 so that the edge of the steel plate is beveled.

The steel plate 32 beveled at one edge thereof in the above manner is released from the pressure of the hydraulic piston and cylinder arrangement 11 and transfered onto the Y-line conveyor by the chain conveyor 16. In this case, the stop member 26 is rotated by the hydraulic piston and cylinder arrangement 27 from the solid line to the dotted line shown in FIG. 5 so as not to obstruct the steel plate moved in the direction shown by the arrow F. The steel plate is moved by the chain conveyor 16 in the direction of the arrow F, when the right-hand edge (in FIG. 5) having been beveled passes over the stop member 26, the movement of the steel plate is terminated. Then the stop member 26 is rotated by the hydraulic piston and cylinder arrangement 26 from the dotted line position to the solid line position, after which the steel plate 32' is moved in the direction of the arrow F' by the Y-line chain conveyor 16 and stopped when the right-hand edge of the steel plate contacts the stop member 26. The steel plate 32' is then clamped on the table 1' by the hydraulic piston and cylinder arrangements 11, and the left-hand edge of the steel plate can be beveled.

In cutting on the Y-line side, the edge having been cut is used as base line, and the positioning of the steel plate 32' is accomplished by the engagement between the cut edge and the stop member 26 which is disposed in the inner side of the Y-line conveyor. Therefore, the beveling is accurately performed.

In case of different sizes of steel plate, the frame 28 is moved by rotation of the shaft 23 driven by the driving device 31 to shift the stop member 26 to the arrows E or E', thus it is able to provide a desired distance between the table 1' and stop member 26.

From the foregoing it will be understood that both sides of various size of the steel plate may be continuously beveled by the machine cutting method without moving the large and heavyweight tables.

We claim:

1. Apparatus for beveling the edges of steel plates comprising a pair of elongate substantially parallel plate support tables, a beveling tool carriage movable longitudinally along each table, first conveyor means between the tables for conveying plates longitudinally of the tables, second conveyor means movable vertically and positioned between the tables for moving plates laterally between the tables and stop means between the tables for laterally aligning plates with respect to the tool carriages.

2. Apparatus as claimed in claim 1, wherein the first conveyor means comprises a pair of parallel lines of roller conveyors and the second conveyor means comprises endless band conveyors between the rollers.

3. Apparatus as claimed in claim 2, wherein the stop means comprises laterally adjustable stops associated with the chain conveyors.